United States Patent [19]

Bash et al.

[11] 3,965,061

[45] June 22, 1976

[54] ADHESIVE COMPOSITION

[75] Inventors: David L. Bash, Verona; Pallavoor R. Lakshmanan, Allison Park, both of Pa.

[73] Assignee: Gulf Research & Development Company, Pittsburgh, Pa.

[22] Filed: May 6, 1975

[21] Appl. No.: 574,897

[52] U.S. Cl. .............................. 260/25; 260/27 R; 260/845
[51] Int. Cl.² ......................................... C08L 93/00
[58] Field of Search ................... 260/25, 27 R, 845

[56] References Cited
UNITED STATES PATENTS 3,595,821  7/1971  Spector ............................... 260/25

*Primary Examiner*—Donald E. Czaja
*Assistant Examiner*—William E. Parker

[57] ABSTRACT

An adhesive composition consisting essentially of two different types of chloroprene polymers, an oil-soluble, heat-hardenable phenol-aldehyde resin, an alkali metal or alkaline earth metal oxide or hydroxide and a zinc salt of rosin. The two different types of chloroprene polymers include (1) a low softening, high crystallizing neoprene and (2) a low softening, medium crystallizing neoprene.

5 Claims, No Drawings

ADHESIVE COMPOSITION

BACKGROUND OF THE INVENTION

1. Field of the Invention

This invention relates to an adhesive composition containing chloroprene polymers, a phenol-aldehyde resin, an alkali metal or alkaline earth metal oxide or hydroxide and a zinc salt of rosin having an improved dead load hot strength.

2. Description of the Prior Art

U.S. Pat. No. 3,595,821 to Spector et al. discloses an adhesive composition containing three different types of chloroprene polymers, an oil-soluble, heat hardenable phenol-aldehyde resin and an alkali metal or alkaline earth metal oxide or hydroxide having high heat resistance, high immediate strength and long bonding range. An optional added ingredient is a metal resinate, such as zinc resinate.

SUMMARY OF THE INVENTION

This invention is directed to an adhesive having an excellent dead load hot strength consisting essentially of (1) a low softening, high crystallizing chloroprene polymer, (2) a low softening, medium crystallizing chloroprene, (3) an oil-soluble, heat hardenable phenol-aldehyde resin, (4) a zinc salt of rosin and (P5) an alkali metal or alkaline earth metal oxide or hydroxide.

In U.S. Pat. No. 3,595,821 Spector et al discloses an adhesive composition having high heat resistance, high immediate strength and long bonding range that must contain a reactive, vulcanizable chloroprene polymer, a low softening, high crystallizing chloroprene polymer, a low softening, medium crystallizing chloroprene polymer, an oil-soluble, heat hardenable phenol-aldehyde resin. Optionally, a metal resinate can also be present. We have found that the composition defined herein, otherwise identical to that of Spector et al but containing only two of the three chloroprene polymers, namely, a low softening, high crystallizing chloroprene polymer and a low-softening, medium crystallizing chloroprene polymer, and a zinc salt of rosin, will have a dead load hot strength as high as that of Spector et al. In other words, provided a zinc salt of rosin is always present, the reactive, vulcanizable chloroprene polymer in the Spector et al. composition can be eliminated and the resulting composition will have a dead load hot strength similar to that of the Spector et al composition.

The two chloroprene polymers that must be used herein are defined as in U.S. Pat. No. 3,595,821 to Spector et al. and include those which have a low softening rate when treated with piperidinium pentamethylene thiocarbamate, coupled with a high crystallizing rate after such treatment, and those which have a low softening rate and a medium crystallizing rate. For purposes of characterizing chloroprene polymers in this respect, a definitive test easily adaptable to laboratory equipment is carried out as follows:

1. A sample of 400 grams of chloroprene polymer is milled for two minutes at room temperature on a 12-inch two-roll rubber compounding mill at a 0.045 inch setting.

2. The Mooney viscosity or plasticity number of the chloroprene polymer is determined using ASTM D-1646 for the Mooney viscosity, or ASTM D-926 to determine plasticity number.

3. The chloroprene polymer is mixed with 0.5 part of piperidinium pentamethylene thiocarbamate per 100 parts of polymer and milled for five additional minutes.

4. The Mooney viscosity or plasticity number is again determined and compared with the previous result. In order to be classified as a low softening polymer, the chloroprene polymer must show less than a 35 percent difference in viscosity or plasticity in the second sample.

5. A piece of the milled polymer, 4 inches by one inch by one-half inch with a smooth surface is exposed at room temperature (about 25° C.) for five hours and the Shore A durometer hardness is then measured. If at this time, the hardness is between 60 and 80, the polymer is considered to have a high crystallizing rate. If the hardness is between 20 and 30, the polymer is further tested as follows:

6. A second sample is taken as in (5) and is warmed for 15 minutes at 158° F., cooled for 15 minutes at room temperature, and the Shore A durometer hardness measured. The sample is then exposed at 0° C. for six hours and the hardness measured once more. In order to be classified as a medium crystallizing polymer, the hardness should not increase more than about 20 points in the second sample.

As stated above one of such chloroprene polymers includes the low-softening, high crystallizing polymers and the second the low-softening, medium crystallizing chloroprene polymers as characterized by the above tests. Commercially, the first type of chloroprene polymer is referred to as neoprene AC and neoprene AD and the second as neoprene W neoprene WHV, neoprene WHV-100, neoprene WHM and neoprene W-Ml. Such commercial designations and definitions therefor are to be found in "The Neoprenes", Murray, R. M. and Thompson, D. C., E.I. du Pont De Nemours and Co., publication 1963.

The oil-soluble, heat hardenable phenol-aldehyde resins employed herein are also similar to those employed in the Spector et al patent referred to above. Such phenolaldehyde resins are well known in the art, and any phenolic resin having these properties can be employed herein. Ordinarily, a para-substituted phenol is employed, such as para-phenyl phenol, para-tertiary-amyl phenol, para-octyl phenol, or para-tertiary-butyl phenol. In some cases such resins may also contain other phenols or phenol itself, but resins produced from para-substituted phenols, and especially para-tertiary-butyl phenol, are usually preferred. The aldehyde condensed with the phenol is most often formaldehyde, although other aldehydes and aldehyde reagents, such as acetaldehyde, para-formaldehyde or hexamethylenetetramine can also be employed. Usually the resin is made with an excess of aldehyde; typically between 1.5 and 2.0 moles of aldehyde per mole of the phenol are used. Alkaline catalysts are generally employed in producing the oil-soluble, heat-hardenable resins utilized herein.

Also present in the composition herein is an oxide or hydroxide of a metal from Groups I-A, II-A, II-B or IV-A of the Periodic Table. The Periodic Table referred to herein is the conventional table found, for instance, at pages 444 and 445 of the "Handbook of Chemistry and Physics", 42nd Edition, published by the Chemical Rubber Publishing Company. Examples of such compounds include sodium hydroxide, potassium hydroxide, the oxides and hydroxides of magnesium, zinc, cadmium and lead, etc. Of these we prefer to use magnesium oxide.

Also required in the adhesive herein is a zinc salt of rosin (including a disproportionated rosin) having a combined zinc content of between about four to about 10.8 weight per cent and a melting point (Ring and Ball softening points) of between about 80° to about 190° C. Rosin disproportionation involves, for example, heating the resin in excess of 200° C. to convert the oxidation-susceptible sites, e.g., conjugated double bond in the abietic acid structure, to less susceptible structures, such as dehydro-abietic acid, tetra-hydro-abietic acid and dihydro-abietic acid.

The adhesives herein can also contain plasticizing components, additional tackifiers, fillers, additives, and the like, and are usually dissolved in an organic solvent or solvent mixture. For this purpose, any of those organic solvents ordinarily employed in polychloroprene compositions can be used, such as for example, aromatic hydrocarbons, chlorinated hydrocarbons and blends containing aliphatic, aromatic hydrocarbons, esters, ketones and the like.

The new improved composition herein will consist essentially of the following components:

| Component | Parts by Weight Broad Range | preferred Range |
|---|---|---|
| Low Softening, High Crystallizing Chloroprene Polymer | 20–80 | 25–75 |
| Low Softening, Medium Crystallizing Chloroprene Polymer | 80–20 | 75–25 |
| Oil-Soluble, Heat-Hardenable Phenol Aldehyde Resin | 30–55 | 35–50 |
| Zinc Salt of Rosin | 5–20 | 10–20 |
| Alkali Metal or Alkaline Earth Metal Oxide or Hydroxide | 5–15 | 7–14 |

Solvent, or combination of solvents, can be present in an amount of about 500 to about 1900 parts by weight, preferably about 800 to about 1200 parts by weight. Antioxidants, such as phenyl-alpha-naphthylamine, substituted and hindered phenols, condensation products of amine and beta naphthol, etc., can be present in an amount of about two to about five parts by weight, preferably about two to about three parts by weight.

The compositions herein can be prepared in any conventional or convenient manner. Thus, the chloroprene polymers, the alkali metal or alkaline earth metal oxide or hydroxide and antioxidant, if used, can be mixed on a cold mill for a period of about four minutes to obtain a first homogeneous mixture. The phenolic resin is then dissolved in an aromatic solvent, for example, toluene, and magnesium oxide is then added thereto. In order to aid or promote the complexing of the magnesium oxide a small amount of water is also added to the mixture. The resultant mixture is mixed for about six hours and the first mixture containing the chloroprene mixture and the remainder of the solvent (hexane and acetone) is then added thereto and the total is stirred for about 12 to 24 hours to obtain the homogeneous adhesive mixture of this invention. The preparation is carried out under room temperature and room pressure.

DESCRIPTION OF PREFERRED EMBODIMENTS

The improved compositions of the present invention can be understood by reference to the following. Compositions were prepared following the specific description set forth above. The compositions were then tested for their dead load hot strength as follows:

Dead Load Hot Strength

This test is designed to measure the resistance of an adhesive to flow under a sustained load (creep) at an elevated temperature. A canvas-to-steel shear specimen having a one square inch bonded area was prepared for each test adhesive. In preparing the specimen two coats of adhesive were applied to the canvas and one coat was applied to the steel surface. The coated surfaces were assembled while still tacky and pressed together with a ten-pound roller. The specimens were aged for one week at room temperature before testing. The specimen was tested by suspending it in an oven at 54° C. at a constant shear load of 1000 grams. The test assembly consisted of a series of clamps attached to the top of the oven; the steel portions of the specimen were secured by these clamps, and the 1000gram load was then hooked into slots which were cut into the canvas portions of the specimen. The specimen was clamped in a vertical position so as to maintain a shear load on the adhesive joints. The oven temperature was increased 5.5° C. every 15 minutes until the bond failed or until a temperature of 160° C. was reached. The temperature at failure was recorded as the dead load hot strength.

The data obtained are tabulated below in Table I.

TABLE I

| Run Number Components, Grams | 1 | 2 | 3 | 4 | 5 | 6 | 7 | 8 | 9 | 10 | 11 |
|---|---|---|---|---|---|---|---|---|---|---|---|
| Neoprene AF | 37.5 | 37.5 | — | — | — | — | — | — | — | — | — |
| Neoprene AC | 37.5 | 37.5 | 100 | — | — | 50 | 50 | 50 | 50 | 50 | 50 |
| Neoprene WHV | 25 | 25 | — | 100 | 100 | 50 | 50 | 50 | 50 | 50 | 50 |
| MgO | 9 | 9 | 8 | 8 | 9 | 9 | 8 | 9 | 8 | 9 | 8 |
| ZnO | 5 | 5 | 5 | 5 | 5 | 5 | 5 | 5 | 5 | 5 | 5 |
| Neozone A | 2 | 2 | 2 | 2 | 2 | 2 | 2 | 2 | 2 | 2 | 2 |
| Polytac 150 | — | 10 | 10 | 10 | — | — | 10 | — | 10 | — | 10 |
| Arofene 6690 | — | — | 45 | 45 | 55 | 55 | 45 | — | — | — | — |
| CKM 1636 | 55 | 45 | — | — | — | — | — | 55 | 45 | — | — |
| CKM 1634 | — | — | — | — | — | — | — | — | — | 55 | 45 |
| Water | 1.25 | 1.25 | 1.0 | 1.0 | 1.25 | 1.25 | 1.0 | 1.25 | 1.0 | 1.25 | 1.0 |
| Toluene | 228 | 228 | 226 | 226 | 228 | 228 | 226 | 228 | 226 | 228 | 226 |
| Hexane | 228 | 228 | 226 | 226 | 228 | 228 | 226 | 228 | 226 | 228 | 226 |
| Acetone | 228 | 228 | 226 | 226 | 228 | 228 | 226 | 228 | 226 | 228 | 226 |
| Results Viscosity, Cps. at 23°C. (Brookfield Viscometer No. 3 Spindle) | 155 | 162 | 156 | 260 | 260 | 300 | 460 | 180 | 185 | 185 | 220 |
| Dead Load, 1000 Grams Failure Temperature, °C. | 160+ | 160+ | 77 | 82 | 93 | 88 | 160+ | 77 | 160+ | 143 | 160+ |

Referring to the components used in the adhesive compositions above, Neoprene AC and Neoprene WHV are as defined above. Neoprene AF is a reactive chloroprene polymer characterized by being at least partially vulcanized when milled for 15 minutes at 100° C. (or higher) with five parts of manganese oxide for each 100 parts of the chloroprene polymer and is further characterized in the publication previously referred to above. Neozone A is the antioxidant phenyl-alpha-naphthylamine sold by du Pont. Polytac 150 is a zinc resinate containing about 10 weight per cent combined zinc having a melting point of 147° C. and is made by Rheichold Chemicals, Inc. Arofene 6690 is an alkyl phenolformaldehyde resin, wherein the alkyl substituent has from three to eight carbon atoms, having a Ring and Ball softening point of 82° to 105° C., and is sold by Ashland Chemicals. CKM 1636 is an alkyl phenolformaldehyde resin, wherein the alkyl substituent has from three to eight carbon atoms, having a Ring and Ball softening point of 104° to 122° C., and is sold by Union Carbide. CKM 1634 is also an alkyl phenolformaldehyde resin, wherein the alkyl substituent has from three to eight carbon atoms, having a Ring and Ball softening point of 87° to 104° C., and is sold by Union Carbide.

The data in Table I illustrates the uniqueness of the adhesive composition defined and claimed herein in providing a bond strength that is adequate at room temperature and above. Runs Nos. 1 and 2 are similar to those of U.S. Pat. No. 3,595,821 to Spector et al. and show that an adhesive composition containing neoprene AF (a reactive, vulcanizable neoprene), neoprene AC (a low softening, high crystallizing neoprene), neoprene WHV (a low softening, medium crystallizing neoprene), CKM 1636 (an oil-soluble, heat-hardenable phenol-aldehyde resin), with or without zinc resinate, will have an excellent dead load hot strength. Runs Nos. 3, 4, and 5 show that if only neoprene AC or neoprene WHV are present in association with the phenolformaldehyde resin, with or without zinc resinate, an adhesive composition having a much lower dead load hot strength is obtained. Runs Nos. 6, 8 and 10 show that if a composition is prepared containing neoprene AC and neoprene WHV, but no neoprene AF, together with a phenol-formaldehyde resin an adhesive composition having a low dead load hot strength is obtained. When to these latter compositions there is added a zinc resinate, however, as illustrated in Runs Nos. 7, 9 and 11, there are obtained adhesive compositions having a dead load hot strength as high as those of Runs Nos. 1 and 2. This is surprising, since in Runs Nos. 1 and 2 each of the three neoprenes was required, but the presence of zinc resinate appeared to impart no beneficial effects thereto.

Obviously, many modifications and variations of the invention, as hereinabove set forth, can be made without departing from the spirit and scope thereof and therefore, only such limitations should be imposed as are indicated in the appended claims.

We claim:

1. An adhesive compositions consisting essentially of about 20 to about 80 parts by weight of a low softening, high crystallizing chloroprene polymer, about 80 to about 20 parts by weight of a low softening, medium crystallizing chloroprene polymer, about 30 to about 55 parts by weight of an oil-soluble, heat-hardenable phenol aldehyde resin, about five to about 20 parts by weight of a zinc salt of rosin and about five to about 15 parts by weight of an alkali metal or alkaline earth metal oxide or hydroxide.

2. The composition of claim 1 wherein there are about 20 to about 75 parts by weight of a low softening, high crystallizing chloroprene polymer, about 75 to about 25 parts by weight of a low softening, medium crystallizing chloroprene polymer, about 35 to about 50 parts by weight of an oil-soluble, heat-hardenable phenol-aldehyde resin, about 10 to about 20 parts by weight of a zinc salt of rosin and about seven to about 14 parts by weight of an alkali metal or alkaline earth metal oxide or hydroxide.

3. The composition of claim 1 wherein the phenol-aldehyde resin is an alkyl phenolformaldehyde resin wherein the alkyl substituent has from three to eight carbon atoms.

4. The composition of claim 1 wherein the zinc salt of rosin is a zinc resinate having a combined zinc content of about four to about 10.8 weight per cent.

5. The composition of claim 1 wherein approximately equal parts by weight of each of said chloroprene polymers are present.

* * * * *